United States Patent [19]

McFarland et al.

[11] Patent Number: 4,658,532
[45] Date of Patent: Apr. 21, 1987

[54] DELUXE NIGHTIME FISHING CORK

[76] Inventors: Johnny M. McFarland; Ruth E. McFarland, both of 1201 Taylor, Lawton, Okla. 73507

[21] Appl. No.: 710,464
[22] Filed: Mar. 11, 1985
[51] Int. Cl.⁴ ............................................. A01K 93/00
[52] U.S. Cl. ................................. 43/17.5; 43/44.87; 43/44.92
[58] Field of Search ................. 43/17.5, 17, 44.87, 43/44.91, 44.92, 44.93, 44.95

[56] References Cited

U.S. PATENT DOCUMENTS

| | | | |
|---|---|---|---|
| 1,374,942 | 4/1921 | Melvin | 43/17.5 |
| 2,539,403 | 1/1951 | Crim | 43/17.5 |
| 3,105,233 | 9/1963 | D'Amore | 43/17.5 |
| 3,107,451 | 10/1963 | Sitzler | 43/44.87 |
| 3,913,256 | 10/1975 | Morris | 43/17.5 |
| 3,935,658 | 2/1976 | Simpson | 43/17.5 |
| 4,010,567 | 3/1977 | MacMillan | 43/17.5 |
| 4,020,580 | 5/1977 | Chappell | 43/17.5 |
| 4,426,804 | 1/1984 | Hutson | 43/44.91 |

Primary Examiner—Gene P. Crosby

[57] ABSTRACT

A fishing float, suitable for night fishing, has a generally spherical shaped float body with hollow upper and lower body sections and having an inner compartment. The upper section has a switch secured therein and the lower section is attachable to a fishing line. Hinge and latch structure secures the sections in a closed position. A gasket arrangement forms a substantially fluid-tight seal between the two sections. The fishing float also has a battery box and a lightbulb for illuminating the float.

2 Claims, 8 Drawing Figures

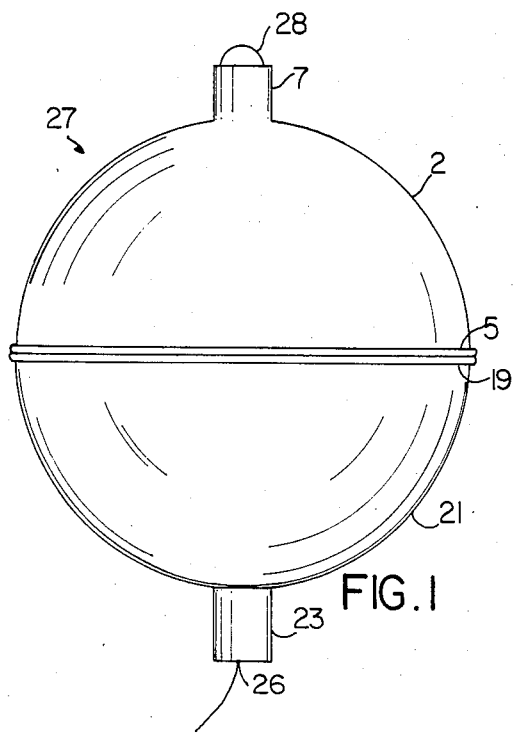
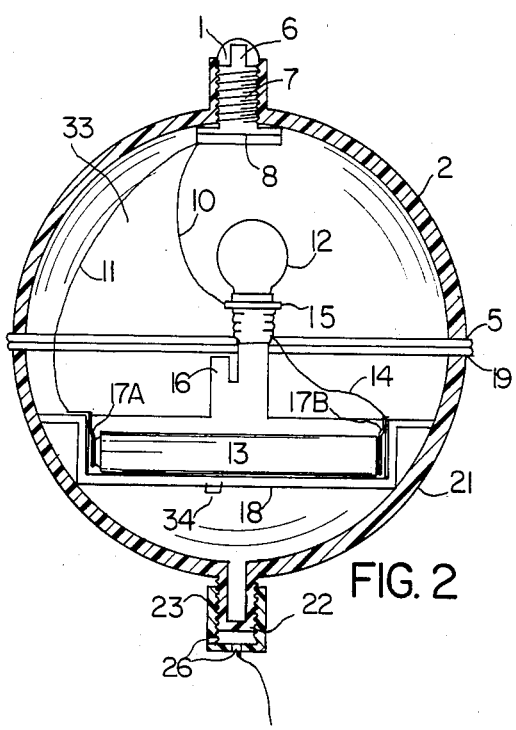
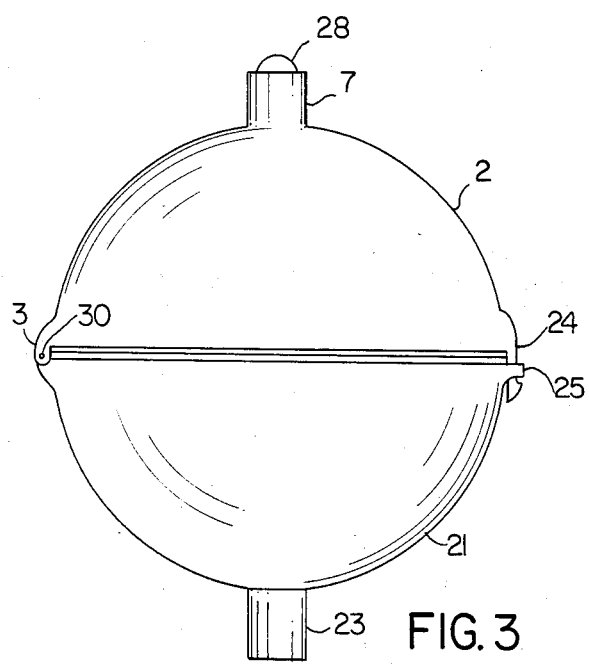
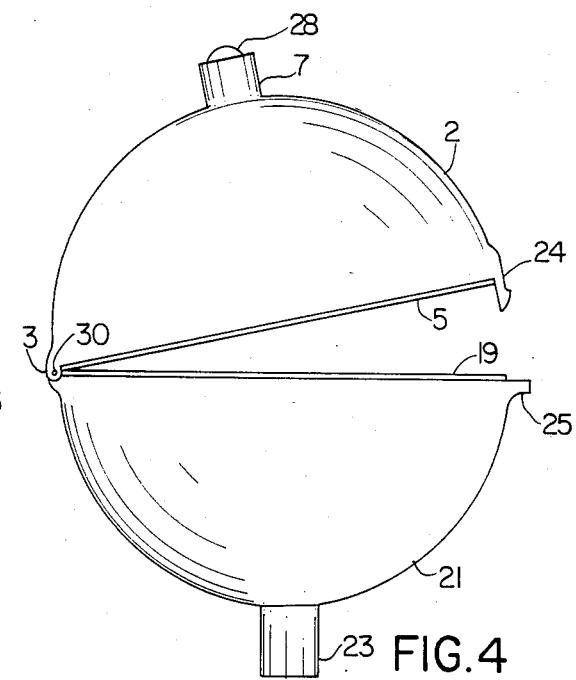

DELUXE NIGHTIME FISHING CORK

BACKGROUND OF THE INVENTION

1. Field of the Invention

The present invention contemplates an improved spherically shaped fishing float that is used for night fishing, the surface of which is illuminated by an internal battery operated light. Gasket means for maintaining a fluid-tight seal; hinge and latch means to secure sections of float body in a closed position. The invention also includes an aperature for attaching and adusting a fishing line.

2. Description of the Prior Art

In the past various devices have been constructed for providing a lighted type fishing float or the like; of which some provide batteries, bulb and or switch means; but to the best of my knowledge none of which provide all of said members together with gaskets latch and hinge means and also with the ability to replace bulb or battery.

SUMMARY OF THE INVENTION

An object of this invention is to provide an improved lighted fishing float for night fishing; wherein the instant invention is constructed in such a manner that it comprises all of said features stated in the prior art to receive maximum benefits for the manufacturer and consumer alike.

BRIEF DESCRIPTION OF THE DRAWINGS

FIG. 1 is a typical elevational view of the instant invention.

FIG. 2 is a cross-sectional view of the the float of FIG. 1, diagrammatically showing the light source and the electrical power source disposed within a portion of the fishing float.

FIG. 3 is a typical elevational view of the float of FIG. 1, showing the invention in a closed position; depicting the hinge and latch means.

FIG. 4 is a typical elevational view of the float showing the invention in a partially opened position with gasket means interposed between the float sections.

DESCRIPTION OF THE PREFERRED EMBODIMENT(S)

Figure 5:
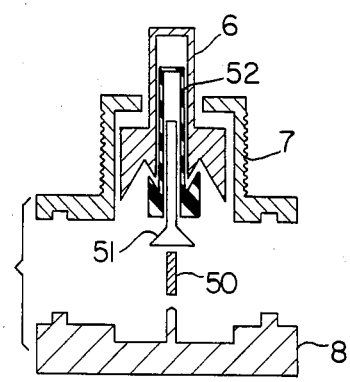
FIG. 5 is an exploded fragmental view of the push-button switch of float of FIG. 1.

Turning now descriptively to the drawings and to FIGS. 1, 2, 3, and 4; the float designated by the numeral 27 generally includes a spherically shaped float body having an upper section 2, a lower section 21 and an inner compartment 33, formed within a portion of the float body 27.

Shown in FIG. 2—the upper section 2 having a central opening 1 with fine threads made into said opening for securing a switch 6 therein; said lower member 21 being attachable to a fishing line via an aperture 26 that is made into the cap 23 that also contains fine threads on the inside surface of said cap.

A protrusion 22 is formed in the center of said lower section of float body which contains threads on the outside surface to accommodate said cap 23, thus firmly securing a fishing line which may be adjusted to desired depth for fishing.

Figure 7:
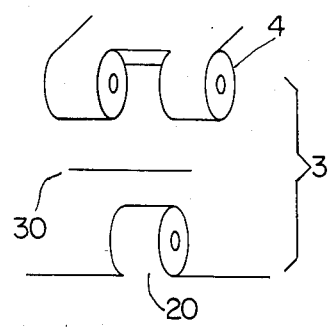
FIG. 7 is an exploded fragmental elevation view of the hinge with the pin removed.
Figure 8:
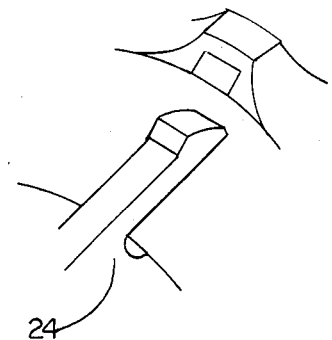
FIG. 8 is an exploded fragmental view of the latch arrangement.

A first hinge section 4 as seen in FIG. 7 is located on the outside of upper section 2. A second hinge section is located on the outside of lower secton 21, to form a single hinge 3. A pin 30 is received into said hinge for pivotal motion. Opposite said hinge 3 there is formed a latch, composed of two parts, a first part having a hook-like structure 24, attached to upper section 2; a second part having a loop-like structure 25 attached to lower section 21. These structures are composed of a strong plastic material so as to lock securely said halves when joined.

Two rubber gaskets designated by the numerals 5 and 19 are provided. First gasket 5 has a separate seal member with upper section 2; a second gasket 19 having a seal member with lower section 19. Each seal member having a portion mating with a surface of said inner compartment 33; and having a portion mating with the other seal member. The gasket means maintains watertight seal between said halves when joined together and latched.

A plastic battery box 18 has surfaces mating with the lower member 21. The battery boxy 18 is made of a plastic type material and of a specific size to accommodate a 1.5 volt size N battery. The battery box has two metal clips 17A and 17B attached to the inside of battery box. A first clip 17A is provided for the positive end of said battery box and a second clip 17B for the negative end of said battery. The battery box has parallel first and second straps formed centrally from one side of the battery box; a first strap 16 with a hook-like structure on the end for locking on to the opposite side of said battery box at point 34 to receive said hook-like structure. The first strap is formed of flexible plastic; the strap holds a battery from being dislodged when the float is casted. A second strap 16 having an end-loop holds a flash light bulb 12 for illuminating the float; said end-loop forming a holder for said light bulb to secure it in place.

FIG. 5 depicts in greater detail the switch, numeral 6 being the push-button. Said switch being composed of six parts. Part 8 is the bottom portion that snaps onto part 7. Part 7 contains threads on the outside to screw into said aperture 1 in upper section of float body. A spring 50 is received into a metal piece 51, then both are received by a piece 52 and they are received into the push-button 6 to complete the whole push-button switch. The switch is comparable to a flash light switch, working on the same principle, to turn the instant invention "on" or "off".

Figure 6:
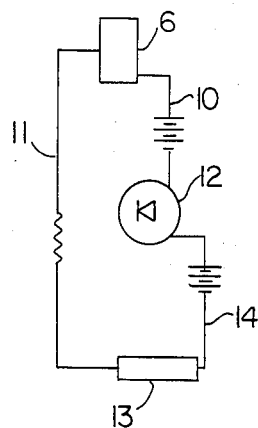
FIG. 6 is a schematic view showing the connection between the light source and the electrical power source of the float of FIGS. 1, 2, 3, and 4.

FIG. 6 shown is a schematic view clearly showing circuit means having wiring 10, 11, 14 metallurgically connected by known soldering technics between said battery, said bulb, and said switch. Circuit means is reliably connected for conducting current through the circuit.

What is claimed is:

1. A hollow plastic float for fishing comprising, upper and lower members forming two halves having a generally spherical form with an inner compartment, said upper member having a central opening and a switch secured therein, said lower member being attachable to a fishing line; first and second hinge sections joining said halves for pivotal motion, said hinge sections being located on the outside of respective said halves to form a single hinge; latch means opposite said hinge for securing said halves in a closed position, one of said halves having a hook-like structure and the other of said halves having a loop-like structure for locking together when joined;

gasket means sealing said halves when latched together, said gasket means having a separate seal member with each of said halves, each seal member having a portion mating with an end face of the respective one of said halves, and a portion mating with the other seal member;

a plastic battery box having surfaces mating with the lower member of said halves, said battery box having parallel first and second straps formed centrally thereof, said first strap having an end loop holding a light bulb for illuminating the float, said second strap holding a battery from being dislodged upon casting the float, and circuit means having wiring metallurgically connected between said battery, light bulb, and switch for reliably conducting current through the circuit means.

2. An improved fishing float, as claimed in 1, including: an aperture for receiving a fishing line.

* * * * *